Oct. 16, 1928.
N. L. WARNER
1,687,811
TUBE SPLICING METHOD AND APPARATUS
Filed Jan. 10, 1928
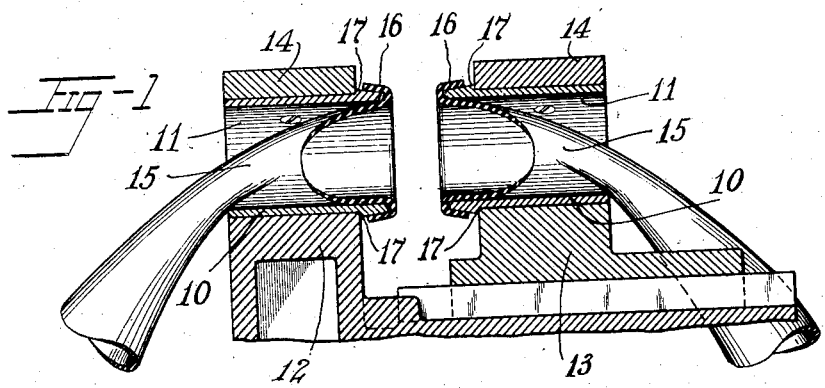
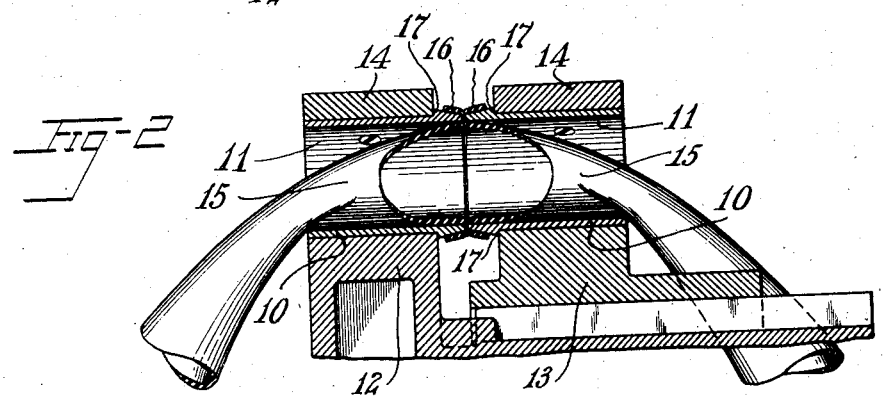
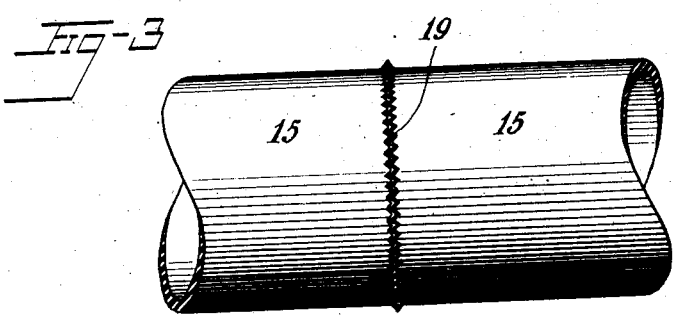
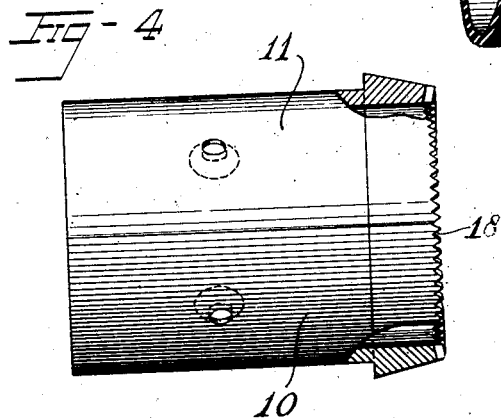
Inventor
Noah L. Warner
By Pierson, Eakin & Avery
Attys Patented Oct. 16, 1928.

1,687,811

UNITED STATES PATENT OFFICE.

NOAH L. WARNER, OF AKRON, OHIO, ASSIGNOR TO THE B. F. GOODRICH COMPANY, OF NEW YORK, N. Y., A CORPORATION OF NEW YORK.

TUBE-SPLICING METHOD AND APPARATUS.

Application filed January 10, 1928. Serial No. 245,712.

This invention relates to methods and apparatus for splicing together two ends of tubing composed of an unvulcanized rubber composition or a similar plastic and adhesive material and it is especially adapted for joining the two ends of a single length of tubing to form an endless tube such as an inner tube for a pneumatic tire.

Heretofore tubes have been spliced by employing a pair of splicing sleeves adapted to have the two tube ends mounted therein and cuffed back over them respectively and to be brought together to join the tube ends in an annular seam and at the same time cut off the cuffed-back portions and thus trim the splice, the sleeves being sectional to permit the removal therefrom of a tube made endless by the splice, but the coacting severing edges of the sleeves have been so shaped as to meet in an annular cutting line lying in a single plane perpendicular to the axis of the tube, and it has been found desirable to apply a reinforcing strip to the interior face of the tube to bridge the seam.

My chief objects are to provide improved procedure and apparatus whereby a stronger seam may be obtained than in the prior art referred to and wherein the application of a reinforcing strip may be omitted.

Of the accompanying drawings:

Fig. 1 is a vertical, longitudinal section of a pair of sectional splicing sleeves and their mountings embodying and adapted to carry out my invention in its preferred form, with the work in place, in readiness for the sleeves to be brought together to seam the tube ends together and to cut off the surplus rubber cuffed back upon the sleeves.

Fig. 2 is a similar view of the same showing the stage of operation at which the seaming and severing step has just been effected.

Fig. 3 is an elevation of the two spliced tube ends.

Fig. 4 is an elevation, with parts sectioned and broken away, of one of the splicing sleeves.

Referring to the drawings, each of the sleeves comprises a lower section 10 and an upper section 11. One of the lower sections 10 is secured in a cradle formed in the upper face of a stationary bracket 12 and the other lower section 10 is secured in a cradle formed in the upper face of a bracket 13 slidably mounted upon the base of the bracket 12 for movement of one of the sleeves from and toward the other in axial alignment therewith. The upper sections 11 of the sleeves are secured in sockets formed in the lower faces of carrying members 14, 14 hinged, with wide hinge bearings, upon the brackets 12 and 13 respectively, for convenience in bringing the sections of each sleeve together to surround the tube ends 15, 15 to be spliced and in opening the sleeve to release the tube after the splicing operation.

The sleeve sections project from the adjacent sides of their mountings, to permit the tube ends to be cuffed back over them, the cuffed back portions, shown at 16, 16, being trimmed off in the splicing operation. Each sleeve section preferably is formed with a shoulder 17 abutting its mounting to withstand the force with which the sleeves are brought together.

At their meeting ends the sleeves are complementally serrated, as shown at 18, to provide a seam of greater length than the circumference of the tube, and the serrations are deeper at the inner than at the outer peripheries of the sleeves so that the sleeves will contact each other only at their outer peripheries, where the serrations as described provide complemental, zig-zag cutting edges adapted first to deform the stock of the two tube ends into interfitting serrated zones and then to trim off the cuffed back portions 16 of the tube ends on a zig-zag or devious line of cut, the trimmed rings of stock then being broken and removed from the sleeves.

The serrated end faces of the sleeves inward from the cutting edges are adapted similarly to serrate and interfit the zones of stock just back of the trimming lines and to press them together in strong adhesive contact but without complete extrusion of the stock from between the faces of the sleeves, and although the geometry of the sleeves as described is such that the two tube ends, joined in outwardly bent, crimped and interfitted zones, present a ridged seam 19, Fig. 3, in which the stock is initially strained out of simple, cylindrical form, I find that when the spliced tube is vulcanized as by enclosing it in a mold and heating it under internal pressure and thus flattening to cylindrical form the outer face of the seam, the result is a zig-zag seam so relieved of strains by the plasticity of the stock before and during vulcanization and so continuous from the outer to the inner face of the tube as to be very strong against longitudinal tension of the tube and very resistant to being opened up by internal fluid pressure.

The serrated form of the sleeves provides a kneading or rubbing of the stock of the contacting surfaces as the sleeves are forced together, which results in an effective union of the surfaces, probably because of a breaking of the surface films of the stock, the effect being somewhat similar to that obtained in hammering a rubber seam. The serrated form of the sleeves also provides a much greater meeting area for the stock of the two tube ends and consequently greater strength of union than is obtained in the prior art and greater strength also is afforded by the fact that longitudinal tension in the tube at the splice is sustained by joined faces of stock which are oblique to the lines of force instead of being substantially perpendicular thereto.

My invention is susceptible of modification without sacrifice of all of its advantages and I do not wholly limit my claims to the specific form of apparatus or to the exact procedure herein described.

I claim:

1. The method of splicing together two tube ends of adhesive stock which comprises cuffing back the tube ends and forcing annular zones of the stock at the folds of the cuffs into serrated form and interfitted relation to each other to form a seam and severing the excess of cuffed back stock from the seam on a zig-zag line of cut having relation to the serrated form of the said zones.

2. The method of joining two elements of plastic stock in an annular seam which comprises forcing annular zones of the respective elements into serrated form and interfitted relation to each other to form a seam and in the same movement trimming excess stock from the seam.

3. The method of splicing together two tube ends of adhesive stock which comprises so forcing together annular zones of the two as to cause them to adhere to each other in an annular seam of greater length than the normal circumference of either and in the same movement pinching off excess stock from the seam.

4. The method of splicing unvulcanized rubber tubes which comprises giving serrated form to annular zones of a pair of tube ends and so pressing them together in registry with each other axially and with said zones in interfitted relation to each other as to cause the tube ends to be joined in a devious annular seam.

5. Tube-splicing apparatus comprising a pair of splicing sleeves formed with serrated end edges.

6. Tube-splicing apparatus comprising a pair of splicing sleeves formed with serrated end edges and having their end faces inward from the said edges serrated but receding from the said edges.

7. Tube-splicing apparatus comprising a pair of splicing sleeves, each of the said sleeves comprising a plurality of sections separable to open the sleeve, and means for forcing one of the sleeves toward the other in axial alignment therewith, the adjacent ends of the sleeves being formed to coact with each other in a cutting operation in an annular line of cutting contact with each other not confined to a single plane perpendicular to the axis of the sleeves.

In witness whereof I have hereunto set my hand this 6th day of January, 1928.

NOAH L. WARNER.